(12) United States Patent
Shikama (10) Patent No.: US 10,942,060 B2
(45) Date of Patent: Mar. 9, 2021

(54) BLADE DRIVE MODULE, IMAGING UNIT PROVIDED WITH BLADE DRIVE MODULE, AND IMAGING DEVICE

(71) Applicant: Nidec Copal Corporation, Tokyo (JP)

(72) Inventor: Kazuo Shikama, Tokyo (JP)

(73) Assignee: Nidec Copal Corporation, Tokyo (JP)

(*) Notice: Subject to any disclaimer, the term of this patent is extended or adjusted under 35 U.S.C. 154(b) by 167 days.

(21) Appl. No.: 15/780,700

(22) PCT Filed: Nov. 28, 2016

(86) PCT No.: PCT/JP2016/085100
§ 371 (c)(1),
(2) Date: Jun. 1, 2018

(87) PCT Pub. No.: WO2017/094638
PCT Pub. Date: Jun. 8, 2017

(65) Prior Publication Data
US 2018/0356283 A1 Dec. 13, 2018

(30) Foreign Application Priority Data
Dec. 3, 2015 (JP) .............................. JP2015-236476

(51) Int. Cl.
*G01J 1/04* (2006.01)
*G03B 9/10* (2006.01)
(Continued)

(52) U.S. Cl.
CPC . *G01J 1/04* (2013.01); *G01J 1/02* (2013.01); *G01J 1/044* (2013.01); *G01J 1/0488* (2013.01);
(Continued)

(58) Field of Classification Search
CPC ...... G01J 1/04; G01J 1/02; G01J 1/044; G01J 1/0488; G01J 1/0492; G01J 5/0834;
(Continued)

(56) References Cited

U.S. PATENT DOCUMENTS 4,907,895 A * 3/1990 Everest ..................... G01J 5/62
356/43
5,127,742 A * 7/1992 Fraden .................... G01J 5/524
374/126
(Continued)

FOREIGN PATENT DOCUMENTS

| JP | 2006-33031 A | 2/2006 |
| JP | 2013-118547 A | 6/2013 |
| JP | 2014-191148 A | 10/2014 |

OTHER PUBLICATIONS

International Search Report dated Feb. 28, 2017 during the prosecution of International Patent Application No. PCT/JP2016/085100.

*Primary Examiner* — David P Porta
*Assistant Examiner* — Jeremy S Valentiner
(74) *Attorney, Agent, or Firm* — Troutman Pepper Hamilton Sanders LLP (57) ABSTRACT

Reduces an increase in temperature of the blade member. Comprises: a blade supporting member, disposed forward of a photodetecting sensor that acts as a thermal source, having an opening 1a through which passes light that is to be incident into the photodetecting sensor; a blade member, supported movably on the blade supporting member, for opening and closing the opening; an actuator for driving the blade member open and closed, wherein: wherein the blade supporting member comprises a containing portion 1b, for containing the blade member and the actuator on a front or
(Continued)

rear surface that is perpendicular to the optical axis of the opening, and an exposed portion that is arranged in parallel to the containing portion.

9 Claims, 7 Drawing Sheets (51) Int. Cl.
*G01J 1/02* (2006.01)
*G01J 5/00* (2006.01)
*G03B 17/55* (2021.01)
*G01J 5/62* (2006.01)
*G01J 5/08* (2006.01)
*H04N 5/225* (2006.01)
*G03B 17/02* (2021.01)

(52) U.S. Cl.
CPC ............ *G01J 1/0492* (2013.01); *G01J 5/0834* (2013.01); *G01J 5/62* (2013.01); *G03B 9/10* (2013.01); *G03B 17/02* (2013.01); *G03B 17/55* (2013.01); *H04N 5/2254* (2013.01); *G01J 2005/0077* (2013.01)

(58) Field of Classification Search
CPC .. G01J 5/62; G03B 9/10; G03B 17/02; G03B 17/55
See application file for complete search history.

(56) References Cited

U.S. PATENT DOCUMENTS

| | | | |
|---|---|---|---|
| 2005/0286889 A1* | 12/2005 | Kihara | G03B 9/10 396/463 |
| 2009/0052886 A1* | 2/2009 | Watanabe | H04N 1/00307 396/486 |
| 2011/0176194 A1* | 7/2011 | Chou | G03B 9/10 359/230 |
| 2015/0319378 A1* | 11/2015 | Hoelter | H04N 5/3532 348/164 |
| 2016/0021286 A1* | 1/2016 | Shintani | G03B 9/40 348/370 |

* cited by examiner

BLADE DRIVE MODULE, IMAGING UNIT PROVIDED WITH BLADE DRIVE MODULE, AND IMAGING DEVICE

CROSS-REFERENCE TO RELATED APPLICATIONS

This is a U.S. national phase application under 35 U.S.C. § 371 of International Patent Application No. PCT/JP2016/085100, filed Nov. 28, 2016, and claims benefit of priority to Japanese Patent Application No. 2015-236476, filed Dec. 3, 2015. The entire contents of these applications are hereby incorporated by reference.

FIELD OF TECHNOLOGY

The present invention relates to a blade driving module, and an imaging unit and an imaging device equipped with said blade driving module.

BACKGROUND

In an ordinary digital camera, or the like, the infrared radiation is cut using an infrared filter, or the like, so that infrared radiation will not be incident into the photodetecting sensor. In contrast, in an infrared camera, no infrared filter is used, so that the infrared radiation will be incident into the photodetecting sensor. Infrared cameras include, primarily, cameras for thermography, night-vision cameras (monitoring cameras), and the like.

In a typical infrared camera, the photodetecting sensor receives not only infrared radiation that is emitted from the subject being measured, but also the effects of heat that is produced within the case, which acts as a thermal source, and which may have adverse effects on imaging using the infrared radiation that radiates from the measurement subject.

Given this, in the infrared camera disclosed in Japanese Unexamined Patent Application Publication 2013-118547, for example, an infrared lens group, an infrared imaging element that is positioned at the focal plane of the infrared lens group, a blade member (a shutter) that is disposed in the optical path of the infrared radiation that arrives at the infrared lens group from a window portion in the housing, and a temperature sensor for detecting the temperature of the blade member are provided, and the captured image that is detected by the infrared imaging element is calibrated based on the temperature of the blade members, detected by the temperature sensor.

SUMMARY

However, even in the prior art, when the increase in temperature of the blade members is too large, there is the risk of reduced calibration accuracy, with an adverse effect on the captured image. Moreover, in some cases the blade member will undergo thermal deformation, causing leakage of light, where deformed blade members may rub against each other, causing a loss of performance.

Moreover, there is the risk that problems that arise from increased temperature and thermal deformation of blade members may occur in not only infrared cameras, but in ordinary digital cameras as well, and in imaging devices such as image measuring instruments.

In contemplation of the issues set forth above, the present invention is provided with the following structure: a blade driving module, comprising: a blade supporting member disposed forward of a photodetecting sensor, and having an opening through which passes light that will be incident into the photodetecting sensor; a blade member, supported movably on the blade supporting member, for opening and closing the opening; and an actuator for driving opening and closing of the blade member, wherein: the blade supporting member comprises: a containing portion for containing the blade member and the actuator, on either a front or a rear surface that is perpendicular to the optical axis of the opening; and an exposed portion that is arranged in parallel to the containing portion.

BRIEF DESCRIPTIONS OF THE DRAWINGS

FIG. 1 depicts an example of a blade driving module according to the present invention, wherein (a) is a front view, and (b) is a cross-sectional view along the line (I)-(I) in (a).

FIG. 3 is a front view wherein the heat dissipating plate has been removed in the same blade driving module, wherein (a) depicts the state wherein the blade members are in the open position, and (b) depicts the state wherein the blade members are in the closed position. Note that in this figure, the double dotted line shows the exposed portion.

FIG. 4 depicts an imaging unit equipped with this blade driving module, wherein (a) is a front view and (b) is a cross-sectional view along the line (II)-(II) in (a).

FIG. 7 is a perspective diagram showing examples, in (a) and (b), of cameras equipped with this same imaging unit.

DETAILED DESCRIPTION

Embodiments according to the present invention will be explained below, in reference to the drawings. In the below, identical reference symbols in different figures indicate identical positions, and redundant explanations are omitted as appropriate.

Figure 1:
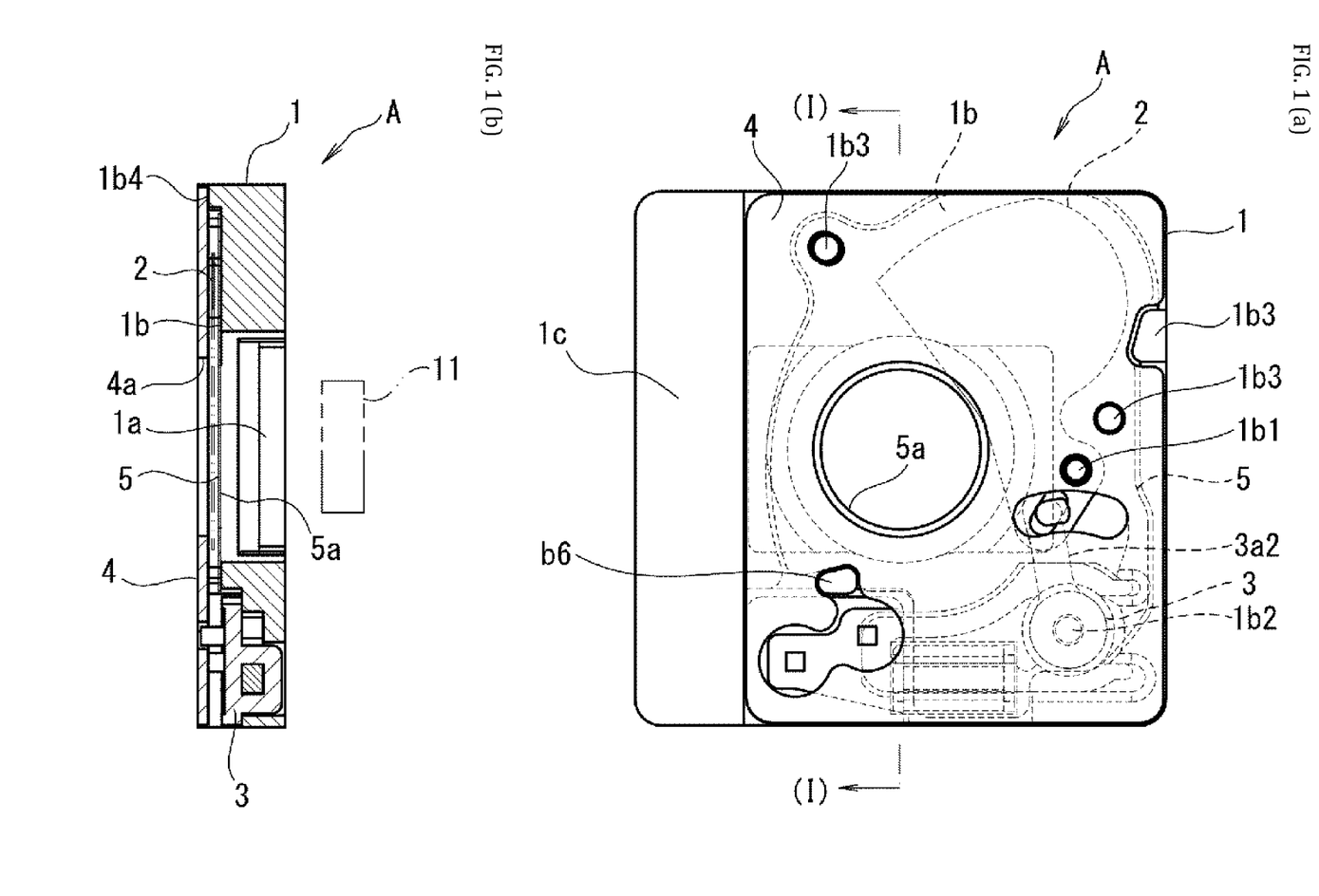

FIG. 1 shows an example of a blade driving module according the present invention. This blade driving module A comprises: a blade supporting member 1, disposed forward of a photodetecting sensor 11 that acts as a thermal source, having an opening 1a through which passes light that is to be incident into the photodetecting sensor 11; a blade member 2, supported movably on the blade supporting member 1, for opening and closing the opening 1a; an actuator 3 for driving the blade member 2 open and closed; a heat dissipating plate 4 that covers the blade member 2 and the actuator in 3; and an aperture plate 5 having an opening 5a that is in communication with the opening 1a of the blade supporting member 1, and, in the example that is illustrated, is structured in a rectangular shape that appears rectangular when viewed from the front.

Note that, in FIG. 1, the photodetecting sensor 11, indicated by the double dotted line, structures an imaging unit B, described below, and is not included in the structure of the blade driving module A.

The blade supporting member 1, as illustrated in the figure, is of a rectangular shape, when viewed from the front, and has an opening 1a of a circular shape that passes therethrough, to enable the light to pass therethrough.

The blade supporting member 1 has a containing portion 1b, for containing the blade member 2, the actuator 3, and the aperture plate 5, on one face, either the front face or the back face, that is perpendicular to the optical axis of the opening 1a (being the front face in the example that is illustrated), and has an exposed portion 1c, so as to be next to the containing portion 1b in the planar direction (being on the left side in FIG. 1(a)).

This blade supporting member 1 is formed from, for example, aluminum, magnesium, some other metal material, an alloy thereof, or the like.

Figure 6:
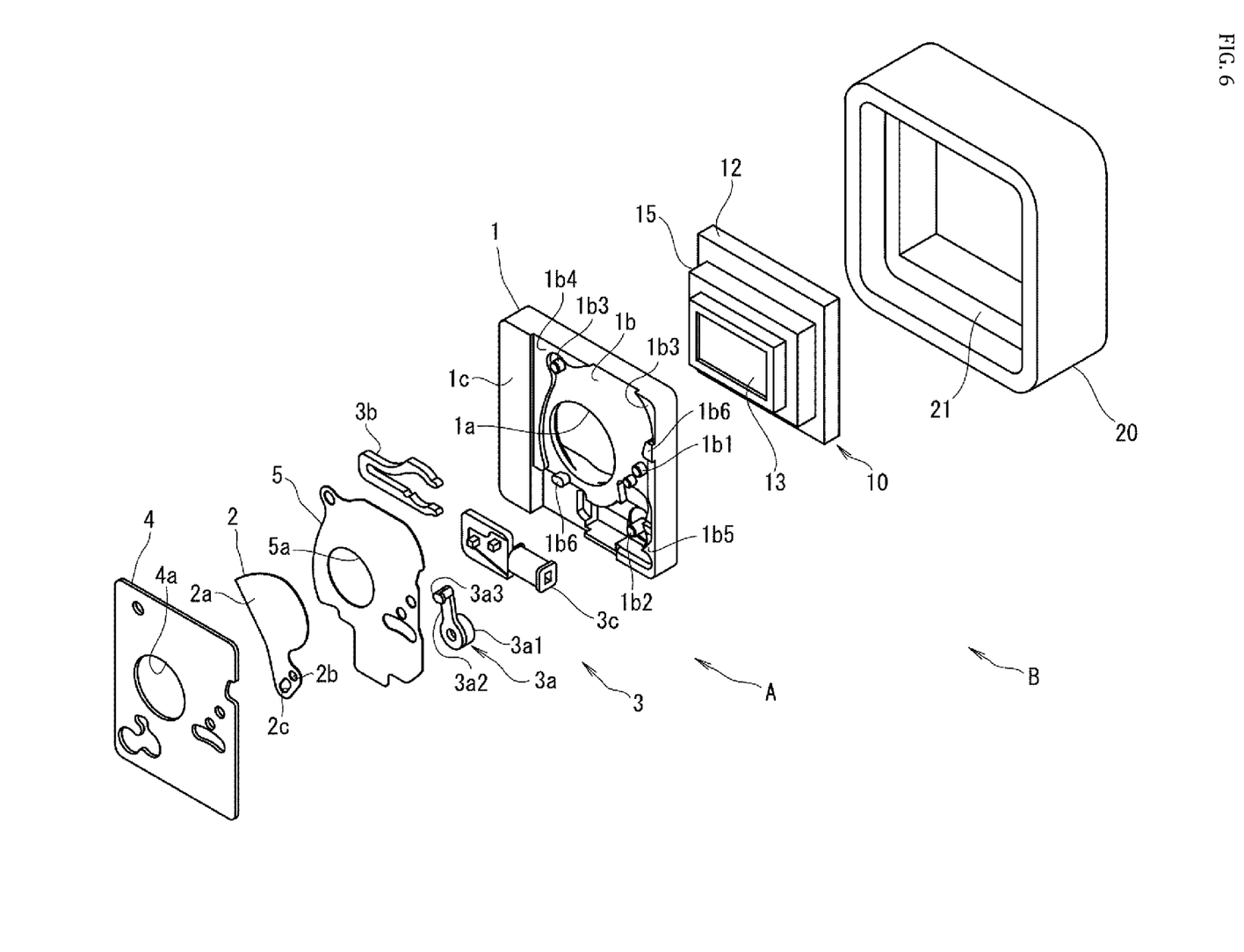
FIG. 6 is an exploded perspective diagram of the same imaging unit.

The containing portion 1b is formed in an essentially open box shape having, therein, the blade member 2, the actuator 3, the aperture plate 5, and the like (referencing FIG. 1(b) and FIG. 6), and has, for example, a supporting shaft 1b1 for supporting the blade supporting member 1 rotatably; a supporting shaft 1b2 for supporting the rotor 3a of the actuator 3 rotatably; a plurality of protruding portions 1b3 that are used when aligning the heat dissipating plate 4 and the aperture plate 5; a limiting protrusion 1b6 for contacting the blade member 2 when there has been a closing operation; and the like.

Moreover, flat contacted surfaces 1b4 and 1b5, for contacting the back face of the heat dissipating plate 4, described below, are provided in the containing portion 1b (referencing FIG. 6). The contacted surfaces 1b4 and 1b5, illustrated in the figure, are provided spaced out toward the exposed portion 1c and toward the opposite.

The exposed portion 1c is provided along the entirety of one edge of the rectangular blade supporting member 1, and protrudes further forward than the peripheral surface of the opening 1a in the open box-shaped containing portion 1b. This exposed portion 1c is, as shown in the figure, an essentially flat surface that is a long rectangle in the plan view, and the entire surface thereof is in contact with the outside air, to function as a heat dissipating surface.

Figure 2:
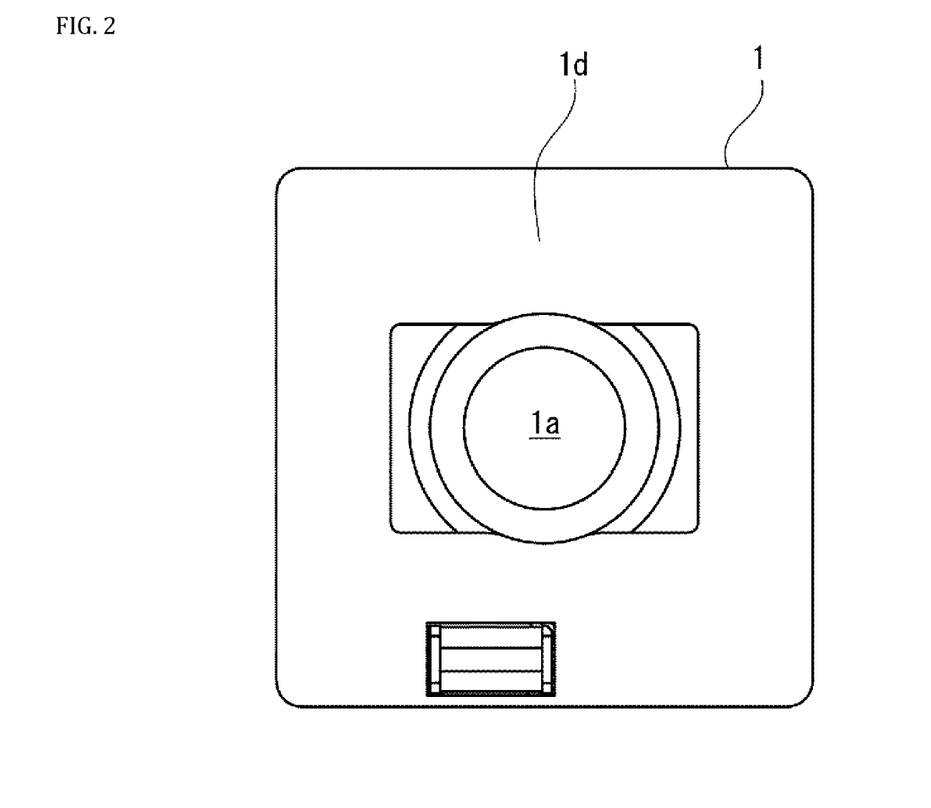
FIG. 2 is a rear view of the same blade driving module.

Moreover, the back face of the blade supporting member 1 is formed into a flat shape surrounding the opening 1a in the center (referencing FIG. 2). In this back face, the part that is toward the outer periphery thereof functions as a heat transferring surface that is in contact with a stepped portion 21 of the supporting member 20 of the imaging unit, described below (referencing FIG. 4(b)). Moreover, the part in the center of the back face is in contact with the air, and functions as a heat dissipating surface.

The blade member 2 is a thin plate-shaped member that has a light-blocking surface 2a on the revolving end side, and also a pivot supporting hole 2b and an engaging hole 2c on the revolving center side (referencing FIG. 6), and is formed from a metal, such as an aluminum alloy, a synthetic resin material that has high thermal durability (for example, an LCP (Liquid Crystal Polymer) resin), or the like. This blade member 2 is provided between the heat dissipating plate 4 and the aperture plate 5, and the pivot supporting hole 2b is installed, in a ring-shape, on the supporting shaft 1b1 of the blade supporting member 1, and the engaging hole 2c engages with a mating protrusion 3a3 of the rotor 3a.

The thickness of the blade member 2, as shown in the figure, is set so as to be less than the dimension of the gap between the heat dissipating plate 4 and the aperture plate 5. In this blade member 2, the front face is near, or in contact with, the inside surface of the heat dissipating plate 4, and the back face is near, or in contact with, the front face of the aperture plate 5.

In addition, a supporting shaft 1b2 is inserted into the pivot supporting hole 2b in the blade member 2, and the mating protrusion 3a3 of the rotor 3a is inserted into an engaging hole 2c.

The actuator 3 is provided with a rotor 3a, a yoke 3b, and a coil 3c, and the like, for rotating the rotor 3a through an electromagnetic force, and is supported on the containing portion 1b of the blade supporting member 1.

The rotor 3a is provided with a circular column-shaped magnet 3a1 that has different magnetic poles in the circumferential direction, and an arm portion 3a2 that is secured to the magnet 3a1 and that protrudes in the radial direction of the magnet 3a1, where a mating protrusion 3a3 is provided on the tip end of the arm portion 3a2, so as to be inserted into the engaging hole 2c of the blade member 2. This rotor 3a is supported rotatably by a supporting shaft 1b2 of the blade supporting member 1.

The yoke 3b is formed from an electromagnetic steel plate, and the like, in an essentially U-shape wherein one piece portion and the other piece portion are connected on one end side thereof, and the inner surface is adjacent to the outer peripheral surface of the magnet 3a1.

A coil 3c is installed in a ring-shape on the one piece portion or the other piece portion of the yoke 3b, and when an electric current is applied, N and S magnetic poles are produced at the one piece portion and the other piece portion of the yoke 3b.

Figure 3:
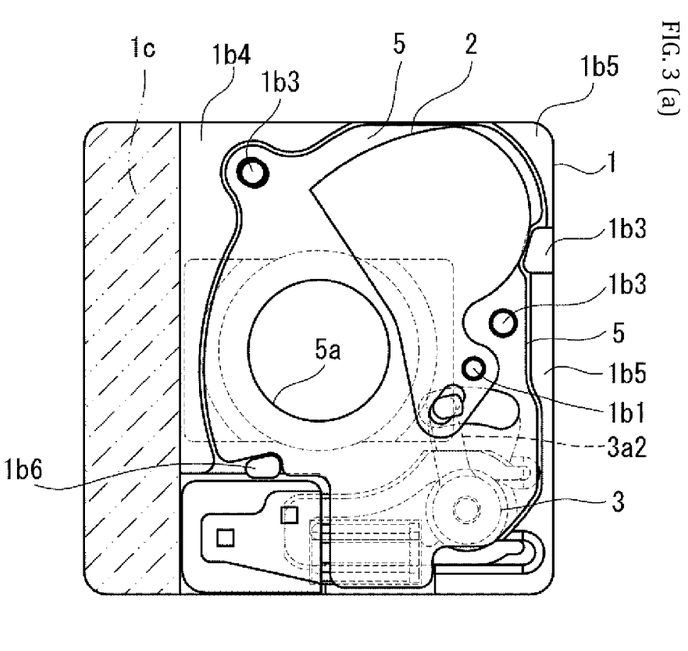

Given this, the actuator 3 of the structure described above, when the coil 3c is in a non-conducting state, an arm portion 3a2 is held in a position toward one of the rotating directions (the direction toward the left, as illustrated in FIG. 3), through the attractive force between the magnet 3a1 and a core 3b. Because of this, the blade member 2 is held in a position wherein the opening 5a is open (referencing FIG. 3(a)).

Moreover, when the coil 3c is in the conducting state, magnetic poles are produced that the one piece portion and the other piece portion of the core 3b, so that the repulsive force between this magnetic pole and the magnetic pole of the magnet 3a1 rotates the arm portion 3a2 in the other direction (being the direction toward the right, as illustrated in FIG. 3). Accompanying this, the blade member 2 rotates so as to close the opening 5a, and contacts the limiting protrusion 1b6.

Note that, as another example, when in a non-conducting state, the blade member 2 is held in the closed state, and can be caused to open through being placed in the conducting state, and the initial open/closed state of the blade member 2 can be set as appropriate depending on the application, or the like, of the blade driving module A.

Moreover, the heat dissipating plate 4 has one surface thereof facing the blade supporting member 1 side, and covers the blade member 2, the actuator 3, the aperture plate 5, and the like, and, on the other hand, the entirety of the other side (being the left side face, as illustrated in FIG. 1(b)) is exposed to the outside, and is connected to the blade supporting member 1.

Explaining in detail, the heat dissipating plate 4 is formed into an essentially rectangular flat plate shape from a metal material, formed in a relatively wide area so as to cover the entirety of parts on the front face of the blade supporting member 1, except for the exposed portion 1c.

Additionally, this heat dissipating plate 4 has, toward the center thereof, an opening 4a that communicates with the opening 1a of the blade supporting member 1, and, at the periphery of the opening 4a, has holes or a notch into which fits a plurality of protruding portions 1b3 of the blade supporting member 1, a hole so as to not interfere with the tip end portion of the supporting shaft 1b 1, an arc-shaped elongated hole so as to not interfere with the mating protrusion 3a3 of the rotor 3a, an opening portion so as to partially expose the yoke 3b and the coil 3c, and the like.

Moreover, on the back face of this heat dissipating plate 4, one edge side part that is positioned toward the exposed portion 1c (being the left side part in FIG. 1(a)), and the other edge side part on the opposite side (being the right side part in FIG. 1(a)), are respectively in tight contact with the tight contacted surfaces 1b4 and 1b5 (referencing FIG. 6) of the blade supporting member 1. That is, at least a portion, on the outer peripheral side, or the like, of the heat dissipating plate 4 is in contact with the blade supporting member 1.

The means for connecting the heat dissipating plate 4 and the blade supporting member 1 may be, for example, bonding, fitting, caulking, or the like.

The aperture plate 5 is installed so as to contact the blade supporting member 1, so as to cover the actuator 3, after the actuator 3 is installed into the containing portion 1b of the blade supporting member 1.

The aperture plate 5 is for formed from a metal material in essentially a thin plate shape, and, toward the center thereof, has an opening 5a for communicating with the opening 1a of the blade supporting member 1, and to limit the brightness, and at the periphery of the opening 5a, has holes or a notch for fitting together with the plurality of protruding portions 1b3 of the blade supporting member 1, a hole for insertion of the supporting shaft 1b1, an arc-shaped elongated hole so as to not interfere with the protrusion of the rotor 3a, a notch for parcel exposing the yoke 3b and the coil 3c, and the like.

Figure 4:
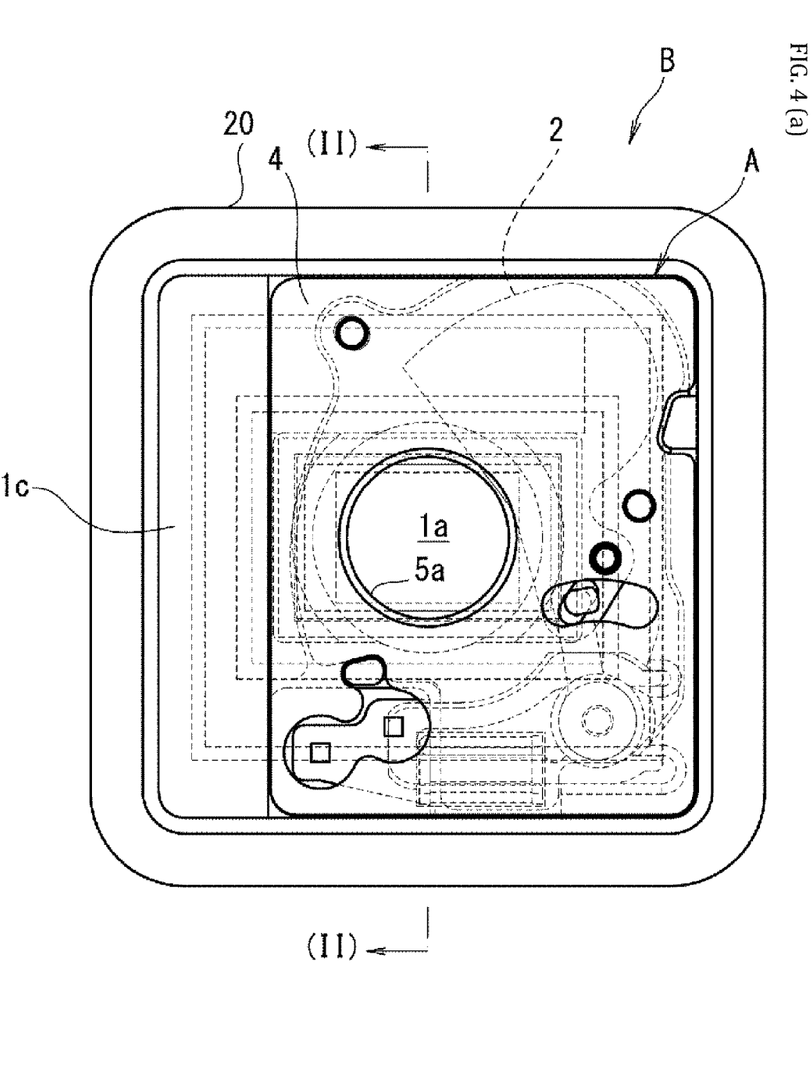
Figure 5:
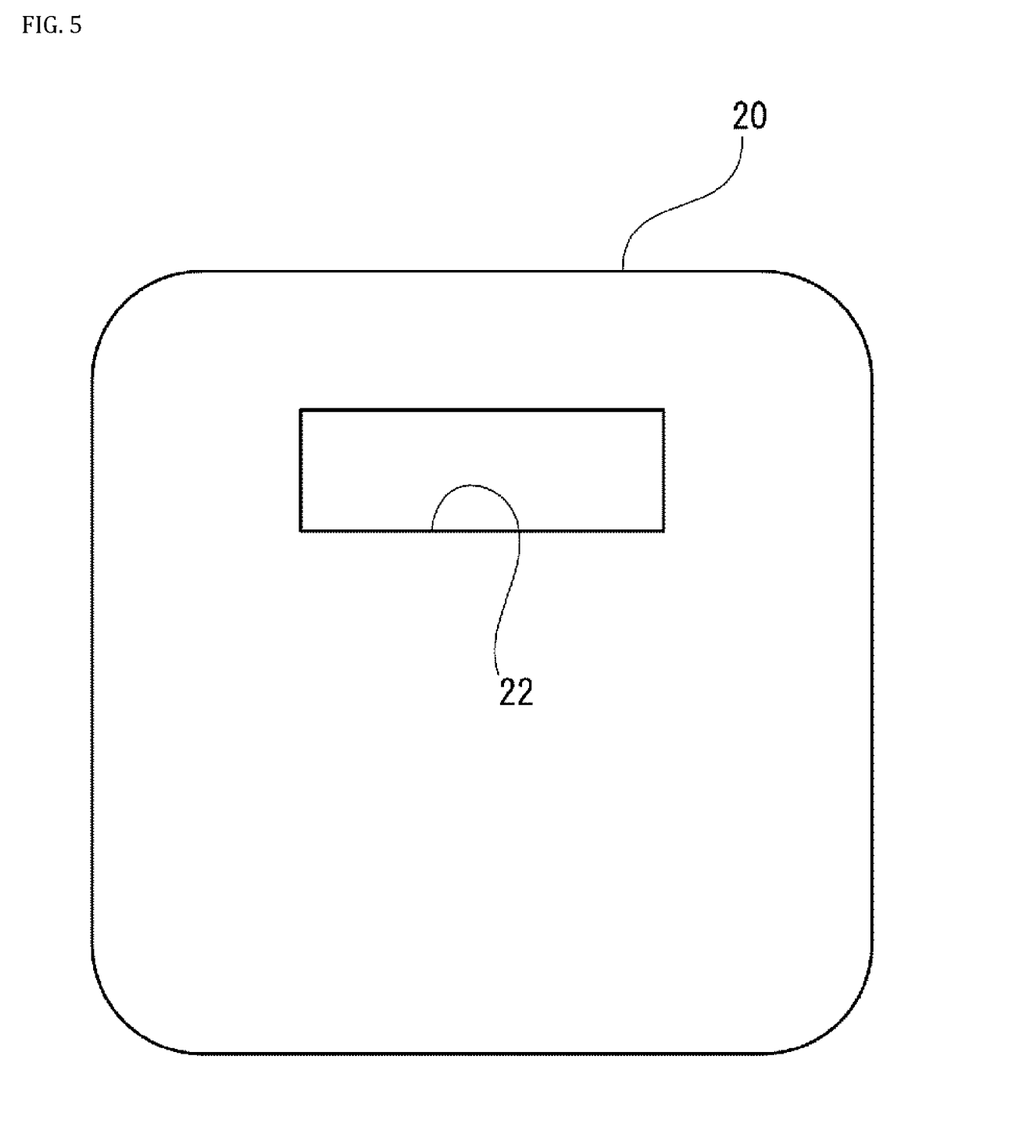
FIG. 5 is a rear view of the same imaging unit.

The blade driving module A, structured as set forth above, is installed in a supporting member 20 that supports a sensor module 10 therein, to structure an imaging unit B (referencing FIG. 4).

The sensor module 10, as illustrated in FIG. 4(b), is an integral structure comprising a photodetecting sensor 11, a substrate 12 for supporting the photodetecting sensor 11 from the back face side, a single filter 13 or a plurality of filters 13, disposed toward the front, and separate from, the photodetecting sensor 11, and a filter supporting member 15, for supporting the filter 13.

The photodetecting sensor 11 is a sensor that absorbs light from the front and outputs an electric signal depending on the optical energy thereof, and may become hot when being used.

This photodetecting sensor 11 may use, for example, a pyroelectric sensor, a thermopile, an infrared sensor such as a bolometer, a CCD image sensor, a CMOS image sensor, or the like.

A substrate 12 is formed in a plate shape that is rectangular from the front, and, if necessary, is provided with, for example, circuitry for converting the received optical signal of the photodetecting sensor 11 into an electrical signal, and for outputting said signal. The substrate 12 supports the photodetecting sensor 11 on the front face, toward the center thereof.

The filter 13 is provided as appropriate depending on, for example, the application of the imaging unit B. For example, if the imaging unit B is to be used as an infrared camera unit, a filter that passes infrared radiation, or a visible light ray-cut filter, or the like, may be used for the filter 13. Moreover, when the imaging unit B is to be used as a normal camera unit, an infrared radiation-cut filter, or the like, is used for the filter 13. This filter 13 is supported on the inside of the front end side of a filter supporting member 15, and is secured through an adhesive bonding, fitting, or the like. Note that in another example a form is possible wherein this filter 13 is omitted.

The filter supporting member 15 is a member that, in cross-section, is an essentially open box-shaped member that is open toward the front, around the optical axis, along with covering the periphery of the filter 13.

The back end portion of the filter supporting member 15 contacts, and is secured to, the front face of the substrate 12. The means for securing the filter supporting member 15 to the substrate 12 may be, for example, bonding, fitting, screwing, caulking, or the like.

Moreover, the supporting member 20 is formed into what, in the cross-section, is essentially an open box shape, wherein the interior space, wherein the front is connected to the outside, is covered by the peripheral side walls and the back end wall face, and, in the front view, forms a rectangle.

A stepped portion 21 is formed, around the entire periphery, on the inner surfaces of the side walls that form the supporting member 20 (referencing FIG. 6).

Explaining in detail for the illustrated example, the stepped portion 21 is provided on each of the surfaces of the side walls on the top, bottom, left, and right, which structure the supporting member 20, so as to enlarge the area of opening on the front side.

Note that Reference Symbol 22 in FIG. 4 is a through hole that is provided, if necessary, used, for example, for inserting interconnections, a connector, or the like.

Explaining the process for assembling the sensor module 10 and the blade driving module A together with the supporting member 20 of the structure described above, first the sensor module 10 is inserted, from the front side, into the interior of the supporting member 20.

The sensor module 10 contacts, and is secured to, the back end wall face within the supporting member 20. The securing means may be, for example, bonding, fitting, caulking, screwing, or the like.

Following this, the blade driving module A is inserted from the front into the interior of the supporting member 20. In FIG. 4(b), the gap S at the periphery of the blade driving module A is for convenience in operations at the time of the insertion.

Additionally, in the blade driving module A, the back face of the blade supporting member 1 makes contact with, and is secured to, the stepped portion 21 at each edge side, on the top, bottom, left, and right. The securing means may be, for example, bonding, fitting, caulking, screwing, or the like.

Moreover, if necessary, a temperature sensor (not shown), for measuring the temperature of the blade member 2, is provided on the outside or the inside of the supporting member 20. This temperature sensor is used for correcting (calibrating) the image that is captured by the photodetecting sensor 11, depending on the temperature that is detected.

The distinctive effects of operation for the blade driving module A and imaging unit B, structured as described above, will be explained in detail next.

During imaging by the imaging unit B, the photodetecting sensor 11 becomes a heat source, and the heat that is produced is transferred to the substrate 12 through the contact surface a on the back face side of the photodetecting sensor 11, and then transferred to the back end wall face of the supporting member 20 through the contact surfaces b and c on the back face side of the substrate 12, as depicted in FIG. 4(b).

Given this, a portion of the heat that is conducted through the supporting member 20 is transmitted to the outside air from the outside surfaces of the back face, side face, front face, and the like of the supporting member 20, to thereby escape, and another portion of the heat is transmitted to the blade supporting member 1 through the stepped portion 21 within the supporting member 20 and the contact surface d of the back face of the blade supporting member 1.

Moreover, a portion of the heat that is conducted through the blade supporting member 1 is dissipated to the outside air from the exposed portion 1*c* (the part indicated by the double dotted line in FIG. 3) on the front face of the blade supporting member 1 at a position that protrudes further forward than the containing portion 1*b*.

Moreover, another portion of the heat that is conducted by the blade supporting member 1 is transmitted to the heat dissipating plate 4 from the contacted surfaces 1*b*4 and 1*b*5 (referencing FIG. 6) of the front face of the blade supporting member 1, or is transmitted to the aperture plate 5 from the peripheral surface of the opening 1*a* within the containing portion 1*b*.

The heat of the heat dissipating plate 4 is dissipated to the outside air from the front face of the heat dissipating plate 4.

Moreover, the heat of the aperture plate 5 is dissipated to the outside air in the vicinity of the opening 5*a*.

Consequently, given the blade driving module A and the imaging unit B of the structures set forth above, the heat that is produced by the photodetecting sensor 11 rapidly diffuses, to be transmitted to various portions other than the blade member 2, and can dissipate to the outside air, thus enabling a reduction in the increase in temperature of the blade member 2.

Consequently, this enables an improvement in the accuracy of calibration when, for example, calibrating the image captured through the photodetecting sensor 11 in accordance with the temperature of the blade member 2.

Moreover, this can prevent the occurrence of leakage of light at the blade member 2 in the fully closed state, or an increase in the frictional resistance of the blade member 2 with the heat dissipating plate 4 or the aperture plate 5, or the like, due to thermal deformation of the blade member 2.

Moreover, even when the blade driving module A is used for a camera for thermography, for example, the heat from the infrared radiation that is received from the outside can be dissipated through diffusing rapidly given the structures of the blade supporting member 1 and the heat dissipating plate 4, and the like, described above.

Figure 7:
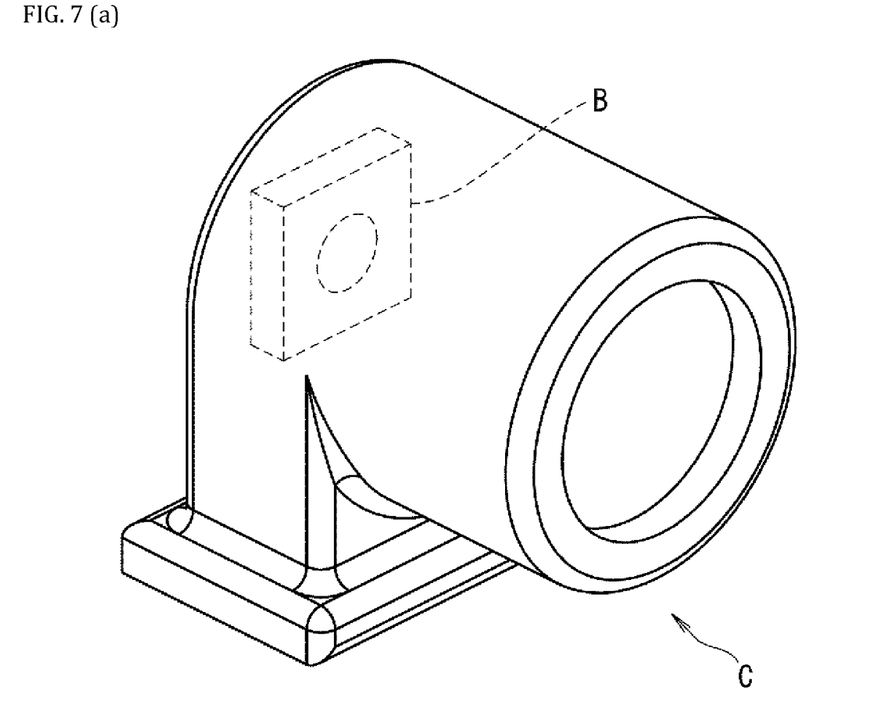

The imaging unit B, described above, structures, for example, imaging devices C and D, as depicted in FIGS. 7(*a*) and (*b*).

The imaging device C is an example of an infrared radiation monitoring camera (night-vision camera), and is equipped, within a casing, with an imaging unit B, a lens that is positioned in front of the imaging unit B, a processing circuit for processing the image signal captured by the photodetecting sensor 11, a memory, and the like.

The imaging device D is an example of a digital camera, and is equipped, within a casing, with an imaging unit B, a lens that is positioned in front of the imaging unit B, a processing circuit for processing the image signal captured by the photodetecting sensor 11, a memory, and the like.

In these imaging devices C and D, the increase in temperature is relatively small, given the structures of the blade driving module A and the imaging unit B, described above, so the accuracy when correcting the captured image is good, and there is also less likelihood of operating failures or exposure defects caused by thermal deformation of the blade member 2.

Note that while, in the embodiment described above, the blade member 2 was disposed on the front side of the blade supporting member 1, as another example the blade driving module A can be used reversed, with the blade member 2 disposed on the back side of the blade supporting member 1. In this alternate example, the back face of the blade supporting member 1 (the end face on the right in FIG. 1(*b*)) is positioned facing forward, and functions as the exposed surface for heat dissipation.

Moreover, while, in the embodiment set forth above, the blade member 2 was structured so as to open and close through rotational motion, as an alternate example the blade member 2 may be structured so as to open and close through linear sliding.

Moreover, while in the embodiment set forth above the structure had a gap S between the outer peripheral surface of the blade supporting member 1 and the inside surface of the supporting member 20 (referencing FIG. 4(*b*)), as an alternate example the blade supporting member 1 and the supporting member 20 may be brought into contact, so as to eliminate some or all of the gap S, to thereby improve the thermal transfer between the blade supporting member 1 and the supporting member 20, to further facilitate diffusion of the heat.

Moreover, while, in the embodiment set forth above, an infrared radiation monitoring camera and a digital camera were used as illustrative examples, as imaging devices C and D, as alternate examples of imaging devices the structure may be of a thermographic camera, a video camera, an image measuring instrument, an image inspecting device, or some other device that detects infrared radiation or visible light.

Moreover, the present invention is not limited to the embodiments set forth above, but rather arbitrary changes are possible within a range that does not change the spirit or intent of the present invention.

The invention claimed is:

1. A blade driving module, comprising:
a blade drive module disposed between a lens and a photodetecting sensor; a blade supporting member comprising a first opening configured to allow passage of light into the photodetecting sensor positioned behind the blade supporting member along an optical axis;
a blade member that is movably supported by the blade supporting member to open and close the first opening; and
an actuator configured to open and close the blade member, wherein:
the blade supporting member comprises: a containing portion for containing the blade member and the actuator, on either a front or a rear surface that is perpendicular to the optical axis of the first opening; and an exposed portion that is arranged in parallel to the containing portion in a planar direction;
the blade member and the blade drive module are housed in a housing portion of the blade supporting member, and are covered with a heat dissipating plate;
a second opening that communicates with the first opening is provided in the heat dissipating plate and is in contact with the blade supporting member,
wherein the heat dissipating plate covers a portion other than the exposed portion on a front surface of the blade supporting member.

2. The blade driving module as set forth in claim 1, wherein an inner surface of the heat dissipating plate is close to or in contact with the blade member.

3. The blade driving module as set forth in claim 1, wherein the blade supporting member includes a support shaft for rotatably supporting the blade member and a limiting protrusion for abutting the blade member.

4. The blade driving module as set forth in claim 1, wherein the blade supporting member includes the housing portion and the exposed portion on a front surface of the first opening which intersects with an optical axis of the first opening.

5. The blade driving module up as set forth in claim 1, wherein an aperture plate having a third opening to limit brightness communicating with the first opening of the blade support member is provided between the blade member and the actuator, and the aperture plate contacts the blade support member and approaches or contacts the blade member.

6. The blade driving module as set forth in claim 1, wherein the housing portion is formed into a concave shape in which the blade member is internally provided, and the exposed portion protrudes forward from a peripheral surface of the first opening in the housing portion to function as a heat dissipation surface.

7. An imaging unit, comprising:
a blade driving module as set forth in claim 1;
a support member having an interior space opened forward;
a sensor module supported on the rear side in the support member and contacting the inner surface of the support member and integrally having the photodetecting sensor; and
a blade support member supported in the support member in front of the support member and in contact with the inner surface of the support member.

8. The imaging device comprising an imaging unit as set forth in claim 7, wherein:
the lens is provided in front of the blade member.

9. The blade driving module as set forth in claim 1, wherein the exposed portion is provided on an entire side of the blade supporting member, wherein the blade supporting member has a rectangular profile.

\* \* \* \* \*